May 1, 1945.  C. H. TURNER  2,375,152
PROPELLER SHAFT BRAKE
Filed May 8, 1943  4 Sheets-Sheet 4
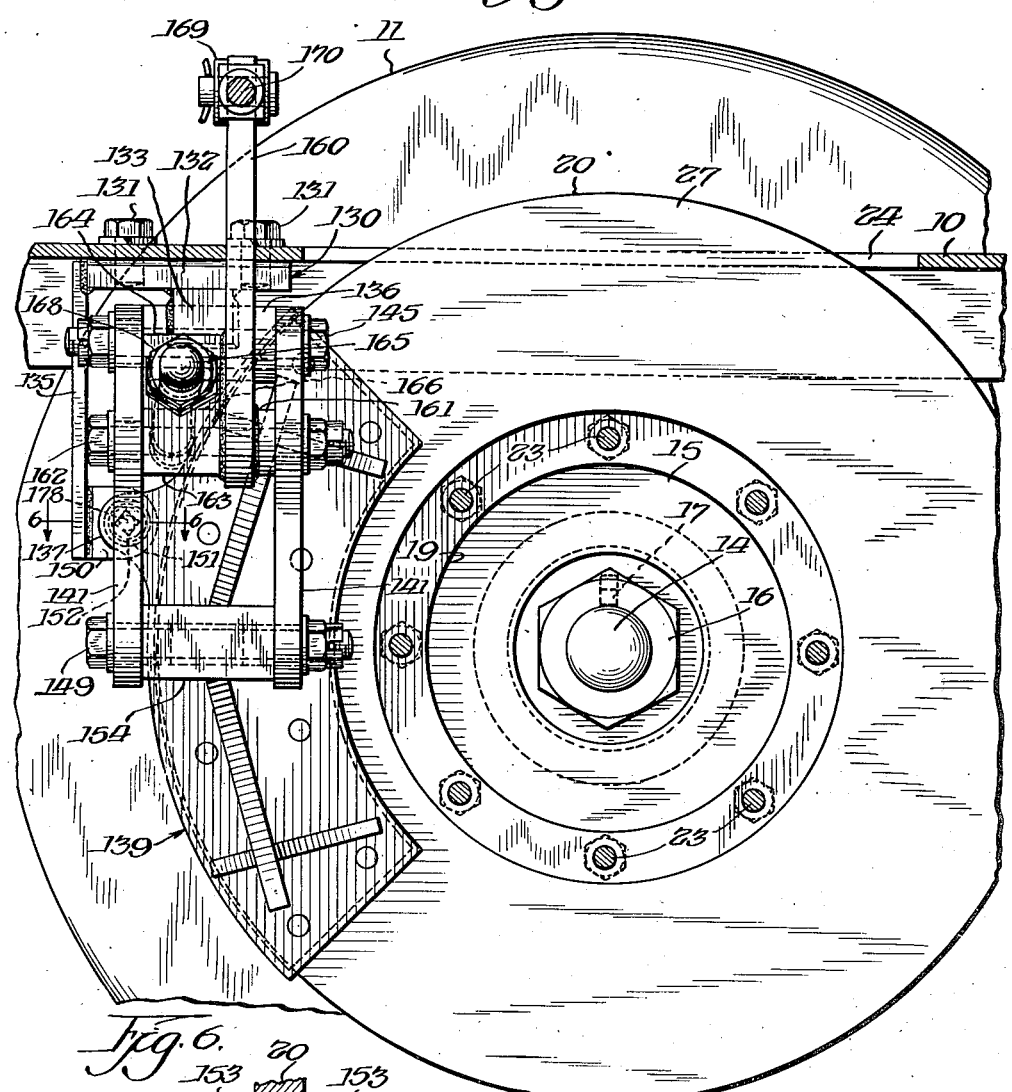
Inventor:
Charles H. Turner:
By Oscar Hochberg
Atty.

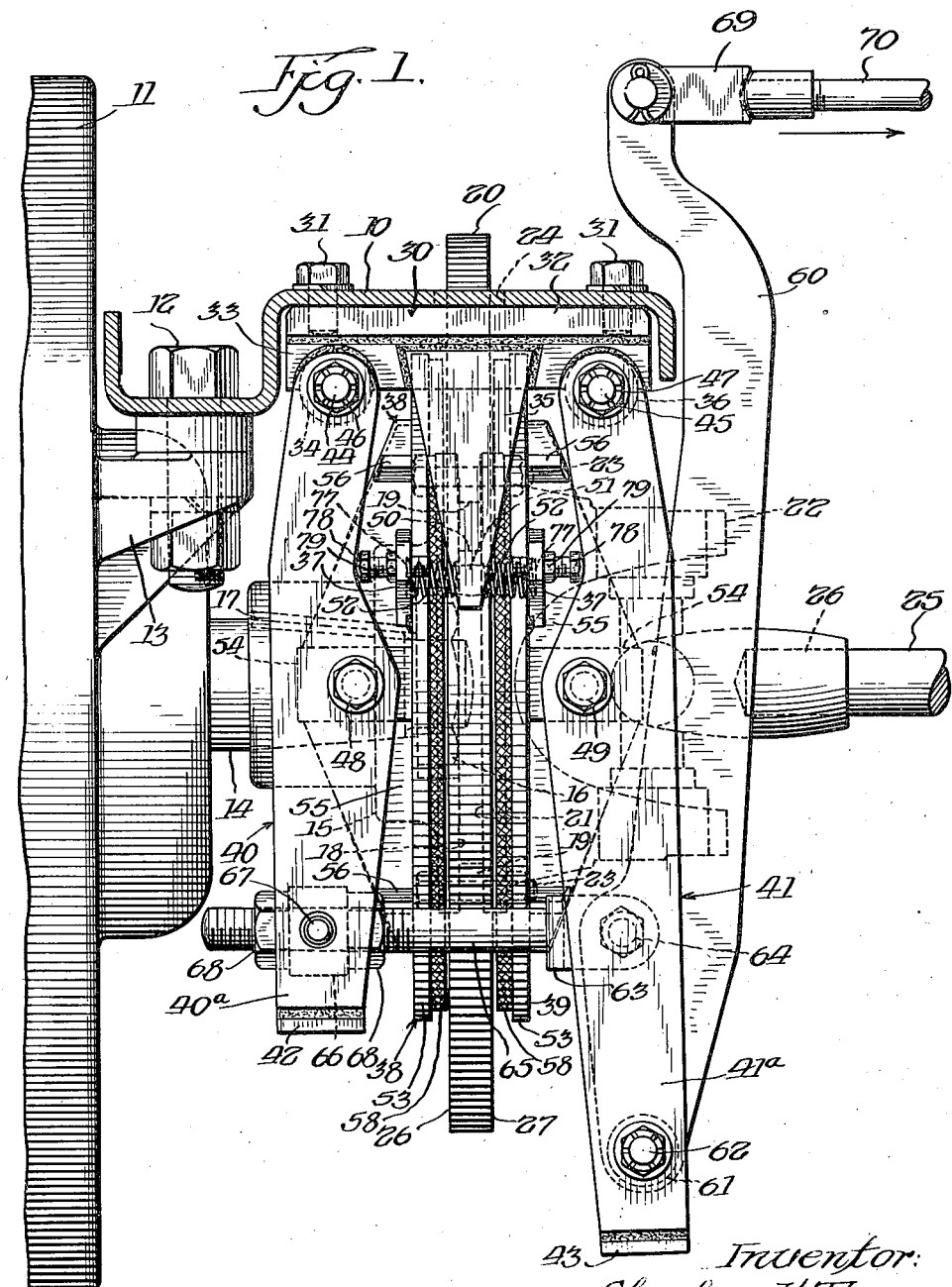

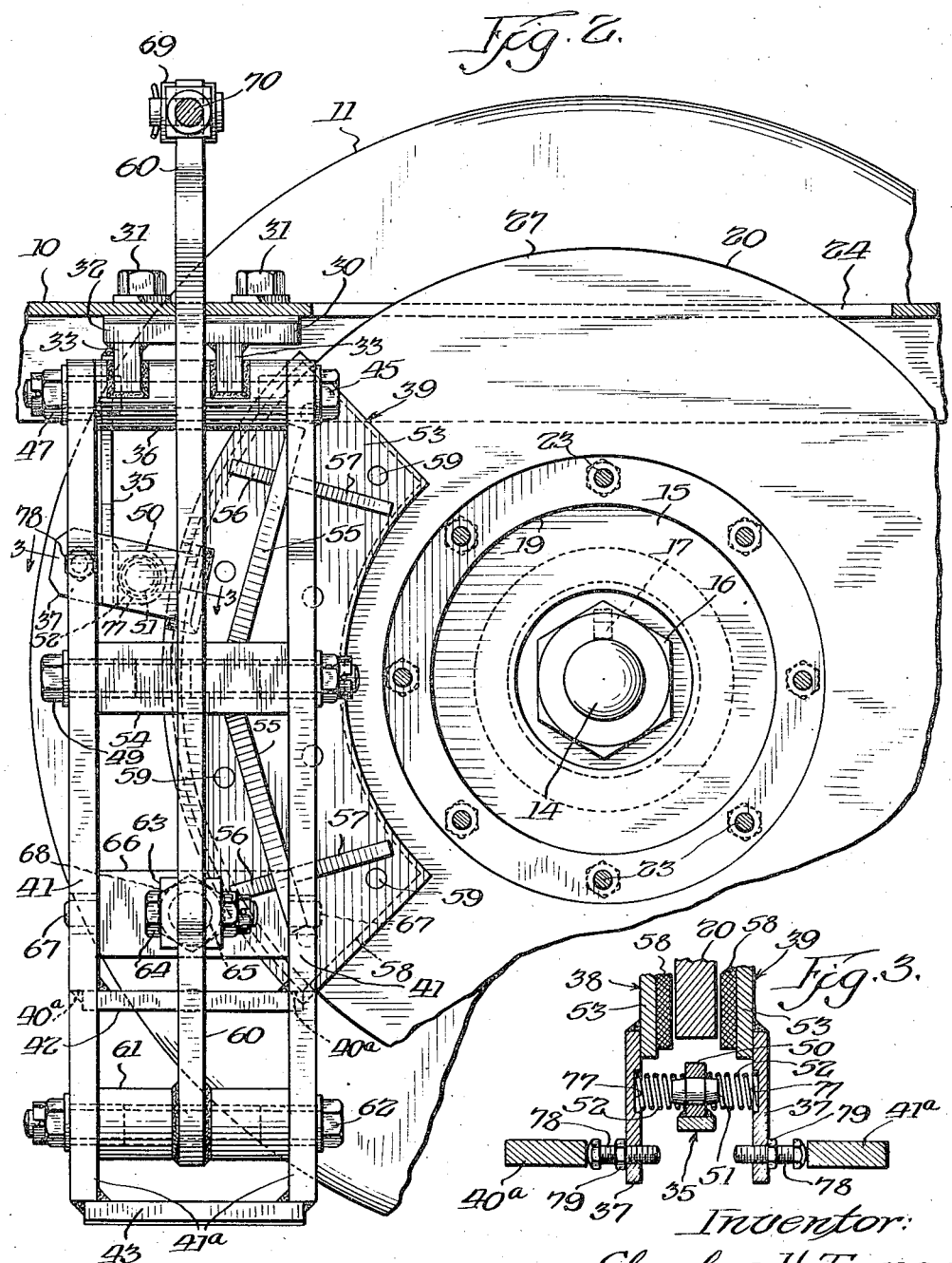

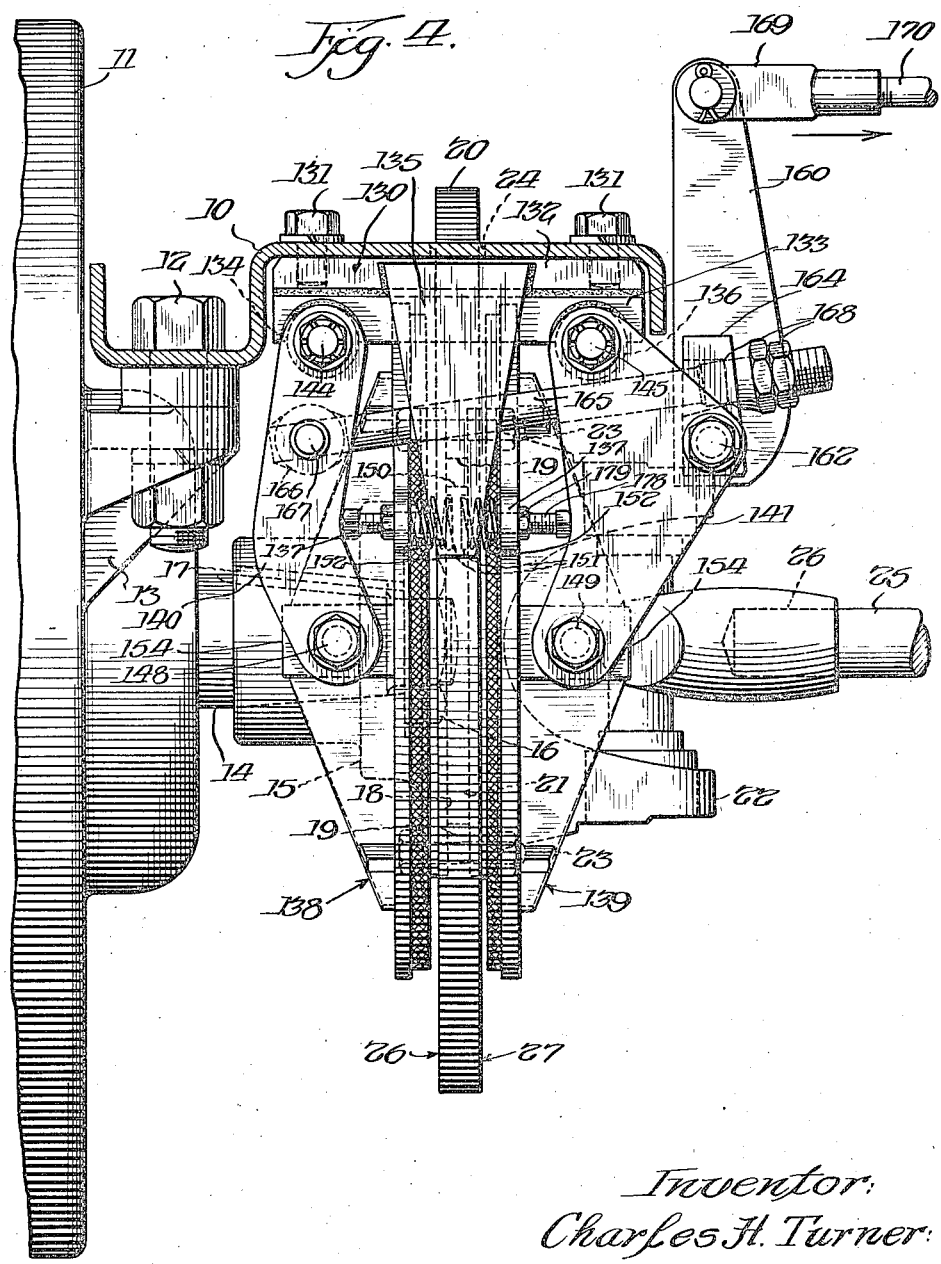

Patented May 1, 1945

2,375,152

UNITED STATES PATENT OFFICE 2,375,152

PROPELLER SHAFT BRAKE

Charles H. Turner, Worcester, Mass., assignor to Pullman-Standard Car Manufacturing Company, Chicago, Ill., a corporation of Delaware Application May 8, 1943, Serial No. 486,122

5 Claims. (Cl. 188—73)

This invention relates to a brake arrangement for vehicles and more particularly to a torque brake for application to a propeller shaft operatively connected with the wheels of the vehicle.

The invention contemplates a brake disc associated with the propeller shaft, with brake shoes disposed at opposite sides of the disc in position to grip the disc therebetween under the influence of suitable brake levers and the principal object of the invention is the provision of a brake shoe adjusting arrangement adapted to maintain the shoes in absolute parallelism with the brake disc and to prevent dragging of the brake shoes against the disc when the brakes are released.

The foregoing and other objects of the invention are attained by the mechanism illustrated in the accompanying drawings in which—

Fig. 1 is a side elevational view of a brake arrangement incorporating the features of the invention in association with a propulsion motor and propeller shaft of a vehicle and showing the brake shoes and levers in fully released position;

Fig. 2 is an end elevational view of the brake mechanism shown in relation to the brake disc and having the propeller shaft and universal assembly removed for clarity;

Fig. 3 is a sectional view taken on the line 3—3 of Fig. 2 showing the relative positioning of the brake shoe release springs and adjustable stop members for limiting relative movement of the shoes with respect to the brake levers;

Fig. 4 is a side elevational view of a brake mechanism including the invention in association with another brake lever arrangement and illustrating the parts in released position;

Fig. 5 is an end elevational view of the brake arrangement illustrated in Fig. 4 with the propeller shaft and universal joint removed; and Fig. 6 is a sectional view taken on the line 6—6 of Fig. 5 showing the relation between the brake shoe release springs, their fixed abutment and the adjustable limit stops on the brake shoes engageable with the brake levers.

In the drawings 10 represents a framing member in the under structure of a vehicle and from which a propulsion motor 11 is supported at one end as by bolts 12 engaging brackets 13 on the motor at opposite sides of the center thereof with the other end of the motor, while not shown, being similarly supported from a framing member at that location. The propulsion motor has a tapered drive shaft 14 projecting therefrom and to which a flanged coupling 15 is secured by means of a nut 16 threaded on the shaft. The coupling is prevented from rotating relative to the drive shaft by means of a key 17 engageable therebetween. The coupling has a peripheral flange 18 to which a brake disc 20 is secured through the medium of an inner complemental flange 19. The attaching flange 19 on the brake disc is disposed between the peripheral flange 18 on the coupling and a companion flange 21 on universal joint assembly 22 and secured by bolts 23 passing through the three flanges to maintain the fixed relation of the parts. The flange 21 has one yoke of the universal joint formed integrally therewith which thus rotates directly with the motor drive shaft 14 together with the coupling 15 and brake disc 20 and the other yoke of the universal is operatively associated with a propeller shaft 25 which is connected with the universal joint 22 by means of a spline 26 to accommodate axial movement of the shaft due to vertical displacement of the running gear (not shown) with which the propeller shaft is operatively connected. With the brake disc 20 thus disposed directly in the vehicle drive between the propulsion motor and the propeller shaft, it will readily be seen that any retarding force applied to the brake disc will act to retard the vehicle. The brake disc is provided with oppositely disposed braking surfaces 26 and 27 which are engaged by braking mechanism hereinafter to be described. The perimeter of the disc extends above the level of the framing member 10 and in order to afford ample clearance for the disc under all operating conditions a slot 24 is provided in the framing member through which the brake disc rotates.

A brake mechanism supporting bracket 30 is secured to the framing member 10 by means of cap screws 31 and comprises a base plate 32, to which laterally spaced depending plates 33 are integrally secured by arc welding and a pair of cylindrical bearing members 34 and 36 bridging the depending plates 33 at opposite ends of the bracket and also secured by welding. A depending bracket 35, centrally disposed of the bracket 30, is integrally secured to one of the depending plates 33 by welding and in the plane of the brake disc 20 at one side thereof for a purpose hereinafter to appear. Brake shoes 38 and 39 are supported from the respective bearings 34 and 36 on the bracket 30 at opposite sides of the brake disc 20 in position to engage the respective braking surfaces 26 and 27 through the medium of brake levers 40 and 41. The respective brake levers 40 and 41, as best shown in Fig. 2, each comprise a fabricated U-shaped structure including laterally spaced lever members 40ª and 41ª connected at their bottom ends and maintained in spaced relation by plates 42 and 43 respectively, which are integrally secured by arc welding. The fabricated lever structures 40 and 41 are pivotally supported from the respective tubular bearings 34 and 36 on the supporting bracket by means of removable bolts 44 and 45, which pass through the respective spaced levers 40ª and 41ª and through the entire length of the intervening bearings 34 and 36 with nuts 46 and 47 for maintaining the assembled relation of the parts. Cotter keys secure the retaining nuts with respect to the bolts and suitable bushings and washers are utilized to avoid undue wear between the supporting bolts and the levers and the bearings as the levers swing relatively during the normal operation of the mechanism.

The brake shoes 38 and 39 are each pivotally mounted in the lever structures 40 and 41 at a point intermediate the length thereof by means of removable bolts 48 and 49 which are held in place by threaded nuts secured by cotter keys with suitable washers and bushings for preventing wear between the cooperating parts. Each of the brake shoes comprises a flat pressure plate 53 shaped on an arc to conform to the circular form of the braking surfaces 26 and 27 on the brake disc 20 and having a centrally disposed pivot block 54 secured thereto by arc welding, which is offset laterally from the generally vertical central plane of the pressure plate, as shown in Fig. 2, with rigidifying web members 55 extending in opposite directions therefrom and secured by welding to reinforce the plate and distribute forces applied at the pivot block over the full extent of the brake shoe. Further to rigidify the pressure plate and to distribute the braking forces, reinforcing web plates 56 and 57 extend from opposite sides of the web plates 55 adjacent the respective ends of each brake shoe and are also secured in place by arc welding wherefore the whole brake shoe structure is integrated to provide a rigid, unitary brake shoe adapted to apply pressures, exerted on the pivot block 54, equally over the entire surface of the pressure plate 53. Each brake shoe is provided with renewable lining 58 secured to the face of the pressure plate by rivets 59 in position to engage the braking surfaces 26 and 27 when the brakes are applied. In the attachment of the brake shoes in the brake lever structures 40 and 41, the offset pivot blocks 54 of the respective shoes are disposed between the respective levers 40ª of the structure 40 and between the levers 41ª of the structure 41 where they are pivotally secured by the bolts 48 and 49 with the lever assemblies offset somewhat in respect to the shoes to provide ample clearance for the universal joint and driving mechanism.

As best shown in Fig. 1, the structure thus far described includes a pair of brake levers pivotally suspended from a rigid frame member at opposite sides of the operative plane of the brake disc adapted to swing at right angles relative to the brake disc with brake shoes pivotally connected to the brake levers intermediate the ends of the levers in opposed relation to the oppositely disposed braking surfaces of the brake disc whereby to provide a braking arrangement adapted to grip the brake disc between the brake shoes when the lower ends of the brake levers are drawn together thereby to supply a retarding force to the rotation of the disc. The force for setting the brakes is applied by a power multiplying equalizing lever 60 having operative connection between the lower ends of the brake levers 40 and 41 to draw the levers together and bring the brake shoes 38 and 39 into frictional engagement with the braking surfaces 26 and 27. The equalizing lever at its lowermost end is equipped with an elongated tubular bearing 61, which is disposed between and functions to center the lever 60 between the levers 41ª of the lever structure 41 with a bolt 62 passing through the entire assembly for pivotally securing the lower end of the equalizing lever in the lower end of the brake lever structure 41.

At a point intermediate the length of the equalizing lever, it is operatively connected with the lower end of the other brake lever structure 40 by means of a link 65 which is pivotally connected to the equalizing lever through the medium of a jaw 63 within which the lever is engaged and removably secured by a bolt 64. The other end of the link 65 is threaded for a substantial portion of its length and passes through a trunnion block 66 pivotally mounted in the lower end of the lever structure 40 by means of oppositely extending trunnions 67 engageable through cooperating openings in the respective levers 40ª which are equipped with suitable bushings. Nuts 68 on the connecting link 65 are disposed at respectively opposite sides of the trunnion block 66 to prevent relative movement of the link when the brakes are applied and provide means for adjustment of the brake shoes 38 and 39 relative to the brake disc to compensate for wear of the linings 58. It will be seen that by adjustment of the nuts 68 on the threaded portion of the connecting link 65 the positions of the brake shoes relative to the brake disc 20 may readily be changed to provide the proper clearance between the linings 58 and the respective braking surfaces 26 and 27 and which adjustment is maintained by the tightening of the nuts against the opposite sides of the trunnion block 66.

The upper end of the equalizing lever 60 is connected to suitable power applying means which may be in the form of a brake operating lever or pedal, or a brake cylinder operated by any suitable type of power. A brake rod 70 is connected to the upper end of the equalizing lever through a clevis 69 having a removable pin secured through the connection and at its opposite end the brake rod is connected to the source of braking power (not shown). As best shown in Fig. 1, it will readily be observed that when a braking force is exerted to move the brake rod 70 in the direction indicated by the arrow, the equalizing lever 60, through its connection with the brake lever 40 by means of link 65, will draw that brake lever toward the brake disc 20 while the brake lever 41 is swung toward the brake disc by reason of the fulcruming action of the equalizing lever about the connection 64 to the connecting link 65 which causes the lower extremity of the equalizing lever through its pivotal connection 62 with the brake lever 41, to urge that brake lever in the direction indicated wherefore the braking force acts to move the lower ends of the brake levers in directions approaching each other thereby to bring the brake shoes 38 and 39, carried by the respective levers, into braking engagement with the braking surfaces 26 and 27. When the brake rod 70 is moved in the opposite direction by the release of the brake operating lever or power applying means to which it is connected, the brake levers 40 and 41 and the equalizing lever 60 will all be moved to their release position thus moving the brake shoes 38 and 39 out of braking engagement with the brake disc.

The brake shoes 38 and 39 are pivotally mounted with respect to the brake levers 40 and 41 and means are provided for maintaining the respective shoes in positions for operation parallel to the braking surfaces 26 and 27 and which functions from a fixed bracket on the vehicle underframe in the plane of the brake disc 20 in such manner that spring seats are provided for the accommodation of springs acting individually upon the respective brake shoes equally to divide the total clearance between the two shoes so that once the shoes are adjusted for parallel clearance from the brake disc all possibility of the ends of the brake shoes dragging on the revolving brake disc is prevented. The arrangement to insure maintenance of the brake shoes in parallel relationship to the brake disc in their released position and to eliminate dragging or chattering of the ends of the brake shoes against the disc centers about the bracket 35 hereinbefore referred to. The bracket 35 comprises a flat plate arc welded to the outer side of the outermost depending plate 33 on the bracket 30 as before described and tapering downwardly from its widest portion at the point of attachment to the plate 33 to a narrow lower end having an inwardly directed plate 50 arc welded to the inner surface of the plate 35 and located in the vertical plane of operation of the brake disc 20. The position of the brake disc is fixed relative to the vehicle underframe cross member 10 by reason of the connection 12 between the propulsion motor and cross member which maintains the relationship of the parts since the brake disc is rigidly attached to the motor drive shaft and since the bracket 30 to which the bracket 35 is integrally secured is rigidly supported on the cross member 10. it will be seen that the plate 50 will always be in alignment with the brake disc. The plate 50 is provided with oppositely extending bosses 51 which are adapted to act as supports for individual coil springs 52 seated against the opposite sides of the plate, as best shown in Fig. 3.

The brake shoes 38 and 39 are each provided with a radially extending rigid bracket 37, arc welded to the respective pressure plates 53 and which project outwardly beyond the outermost brake levers 40ª and 41ª with the plate 50 on the lower end of bracket 35 disposed therebetween. The brackets 37 are located above the pivotal axes of the respective brake shoes as is the spring seat member 50 and the springs 52 are adapted to engage the brackets 37 to exert forces applied between the spring seats and the brackets tending to rotate the upper ends of the respective shoes in directions away from the brake disc with the springs confined within pockets 77 provided for the purpose in the respectively opposing faces of the brackets. With the springs 52 moving the brake shoes away from the brake disc, the rotation of the respective brake shoes about their pivots 48 and 49 beyond positions paralleling the braking surfaces 26 and 27 is prevented by adjustable screws 78 threaded through the brackets 37 and secured by lock nuts 79 in position to have the heads of the screws engage the brake levers 40ª and 41ª thereby to limit the pivotal movement of the brake shoes relative to the brake levers. By the arrangement of the springs and adjusting screws described, the positions of the brake shoes relative to the braking surfaces on the disc 20 may be adjusted initially in parallel relation in released condition of the mechanism by adjusting the screws 78 to rotate the brake shoes to the desired position and then setting the lock nuts 79. The heads of the adjusting screws 78 bear against the brake levers 40ª and 41ª when the mechanism is released and when the screws are rotated in a direction to withdraw them from the brackets 37 the brake shoes 38 and 39 will be rotated about their pivotal connection 48 and 49 to the brake levers, in directions causing their upper ends to approach the brake disc 20, increasing the compression on springs 52 and when the adjusting screws are turned in the opposite direction to enter the brackets 37 the shoes are rotated in the opposite directions under influence of springs 52 which are disposed in compression at all times. Since the springs 52 are individual to the respective brake shoes 38 and 39 and function in opposite directions from fixed spring seats in the plane of the brake disc, it will be seen that the total clearance between the brake shoes will always be divided equally upon opposite sides of the brake disc and once adjusted through the medium of screws 78 the parallel relation of the shoes with respect to each other and to the brake disc will be maintained so long as the relationship of the bottom connecting link 65 with respect to the trunnion block 66 remains unchanged as determined by the adjustment of the nuts 68.

When the brake linings 58 become worn in use it is necessary to adjust the nuts 68 on the connecting link 65 to bring the brake levers closer together thereby to take up the excess clearance between the brake shoe linings and the brake disc created by the wear and whereupon the adjustment of the screws 78 must be changed to bring the brake shoes into parallelism with the disc 20 which, in compensating for wear, will of course be accomplished by rotating the screws 78 in such direction that they are unscrewed from the brackets 37 and this with the bringing together of the brake levers 40 and 41 increases the tension on springs 52. The springs 52 and the adjusting screws 78 are all disposed to the same side of the pivotal axes of the brake shoes so that in operation the forces of each are opposed by the other and with the combined forces of each cooperative pair, including one spring and one adjusting screw, resisted by the respective brake levers against the thrust exerted from the spring seat 50 as a base, the effect is to rotate the brake shoes until the heads of the screws 78 contact the brake levers and which, when the screws are properly adjusted, will bring the brake shoes parallel with and in equally spaced relation to the braking surfaces 26 and 27 when the mechanism is released. When a brake application is made, the bottom ends of the brake shoes, due to the suspension, come in contact with the braking surfaces first, after which the entire area of the respective shoes is brought into frictional engagement with the revolving brake disc by the pressure exerted at the the center of each shoe through the brake levers and compressing springs 52 in the operation. When the brakes are released the sequence of operations is reversed with the top ends of the brake shoes releasing first due to the action of the springs 52 and when the heads of adjusting screws 78 first come in contact with the brake levers the bottom ends of the shoes are then forced away from the braking surfaces until in full release the brake shoes are parallel with and spaced equidistant from the respective braking surfaces.

In the arrangement illustrated in Figs. 4, 5, and 6, the propulsion motor 11 in respect to its support 13 from the cross member 10 and the relations of the brake disc 20, coupling 15, universal 22 and the propeller shaft 25 and their connection to the motor drive shaft 14 all are exactly the same as described in connection with the structure illustrated in Figs. 1, 2 and 3, and the same reference numerals have been applied to like parts in both structures. The brake shoe structures 138 and 139, except for that part cooperating with the bracket 135, also are identical with the brake shoes used in the structure previously described and therefore further detail description of these parts likewise is thought to be unnecessary. The brake lever arrangement as shown in these figures however differs from that illustrated in the previous figures, but suspends the brake levers 140 and 141 at opposite sides of the brake disc from a supporting bracket 130 similar to the supporting bracket for the other arrangement, but having only one depending plate 133 arc welded to the base plate 132 and from which the brake levers are pivotally suspended. The bracket 130 is supported in the cross member 10 by cap screws 131 taking the base plate 132 and secured by lockwashers under the heads of the screws. The brake levers 140 and 141 are pivotally supported from tubular bearing members 134 and 136 respectively, which are arc welded to the plate 133 in spaced relation such as to suspend the levers adjacent and in opposed relation to the respective braking surfaces 26 and 27 on the disc 20.

The levers 140 and 141 each comprise a pair of spaced lever members, the levers of each pair being of similar contour and disposed at opposite ends of the respective supporting bearings 134 and 136 where they are pivotally secured by means of removable bolts 144 and 145 which extend through suitable bushings in the levers and bearings to prevent undue wear on the relatively movable parts. At their lowermost extremities the levers of each pair are disposed at opposite sides of the pivot blocks 154 of the respective brake shoes 138 and 139 and to which they are pivotally connected by means of bolts 148 and 149 passing through suitable bushings in the levers and pivot blocks and secured by cotter keyed nuts which permit of the disassembly of the parts. Thus it will be seen that the brake levers 140 and 141, supported at their upper ends from the bracket 130, suspend the brake shoes 138 and 139 from their lower ends at opposite sides of the brake disc 20 in position to grip the braking surfaces 26 and 27 therebetween.

The brake shoes are brought into braking engagement with the disc 20 by means of a power multiplying equalizing lever 160 and a connecting link 165. The equalizing lever 160 at its lower extremity is disposed between and pivotally connected with the pair of brake levers 141 at a point intermediate the length thereof as best shown in Fig. 5 by means of a removable bolt 162 which passes through the three levers in suitable bushings and is secured by a cotter keyed nut. An extended bearing for the bolt 162 is provided in the equalizing lever by a laterally extending bearing portion 161 at one side of the lever secured thereto by arc welding and by a portion 163 at the other side of the lever also integrally secured by welding, both of which with the lever are penetrated by the bolt and are of such dimension as to extend continuously between the spaced levers 141. It will be noted that the bearing portion 161 is of less extent laterally than the portion 163 wherefore the position of the equalizing lever is laterally offset with respect to the center of the space between the brake levers 141 and which provides for the accommodation of the link 165 for connecting the equalizing lever to the other brake lever 140. The bearing portion 163 is integral with an upwardly extending bracket 164, both of which are rigid with the equalizing lever 160 by reason of their welded connection. The bracket 164 is provided with an opening through which the link 165 extends and the other end of the link is pivotally anchored between the pair of brake levers 140 at a point intermediate their length by means of oppositely extending trunnions 167 engageable in bushings mounted in openings in the respectively spaced brake levers. The trunnions 167 are formed integrally with a trunnion block 166, through which the link 165 extends and is integrally secured by welding and which extends continuously between the spaced levers 140 with the trunnions extending through the respective levers thereby pivotally anchoring the connecting link and providing a connection between the brake levers 140 and 141 operative between points intermediate the ends of each. The end of the link 165 associated with the equalizing lever 160 is threaded and passes through bracket 164 at a point intermediate the ends of the equalizing lever where it is adjustably secured by nuts 168, one of which comprises a locking nut for securing the assembly after the adjustment has been made by the other. By means of the adjustment 168, the total clearance between the brake linings on the brake shoes 138 and 139 and the respective braking surfaces 26 and 27 may be regulated and changed to compensate for any variations due to wear on the linings.

With the link 165 anchored intermediate the ends of brake lever 140 and pivotally connected at its other end intermediate the ends of equalizing lever 160 which in turn is pivotally connected at its lower end intermediate the ends of brake lever 141, it will be seen that by moving the upper end of the equalizing lever in the direction indicated by the arrow in Fig. 4, the brake levers, being anchored at their upper ends to the bracket 130 and pivotally connected at their lower ends with the respective brake shoes 138 and 139 intermediate their ends at the pivot blocks 154, will be drawn together to bring the brake shoes into equalized engagement with the respectively opposed braking surfaces 26 and 27. The braking force is applied from any suitable source of power through the brake rod 170 connected to the upper end of the equalizing lever 160 by means of a cotter keyed pin and clevis 169 and when operated as described, the equalizing lever fulcrums about the connection 162 to force the lever 141 and brake shoe 139 toward the brake surface 27 against the force exerted by the connecting link 165 on the bracket 164 which thus draws the brake lever 140 and brake shoe 138 toward the brake surface 26 and thereby gripping the revolving brake disc 20 therebetween.

The brake shoes are moved away from the brake disc when the mechanism is released and when in released position are maintained in parallelism with the respective braking surfaces 26 and 27 as in the arrangement shown in Figs. 1–3. The bracket 135, however, is welded at its upper end directly to the base plate 132 and tapers downwardly to its lower end where it is provided with an inwardly directed plate member 150 arc welded thereto and having oppositely disposed pockets 151 for the reception of coil springs 152 engageable with the respective brake shoes above their pivotal axes to rotate the shoes thereabout. The springs 152 are individual in their operation to the respective brake shoes and engage radially disposed bracket members 137, which in this construction are integral with the pressure plates 153 of the brake shoes to press the shoes away from the brake disc. The brackets 137 are each provided with a projection 177 over which the coil springs are adapted to fit and which with the spring pockets 151 on the spring seat plate 150 support the springs in operative positions. Adjusting screws 178 are threaded through the radial brackets 137 and in this arrangement are disposed directly in axial alignment with the springs 152 and therefore enter the projections 177 about which the springs seat. The heads of the adjusting screws engage the respectively associated brake levers 140 and 141 to limit the pivotal movement of the brake shoes about their axes and lock nuts 179 maintain the desired setting of the screws after their final adjustment.

As in the arrangement before described, the springs 152 and adjusting screws 178 are all disposed above the pivotal axes of the brake shoes so that in operation the forces of the respective springs and associated adjusting screws are opposed each by the other and with the force of each spring resisted through the corresponding adjusting screw by the associated brake lever against the force exerted from the spring seat 150, the effect will be to rotate the brake shoes until the heads of the screws 178 contact the brake levers and which when the screws are adjusted properly will bring the shoes in parallel equally spaced relation to the braking surfaces 26 and 27 in the released position of the mechanism. With the springs 152 functioning individually to the respective brake shoes 138 and 139 and thrusting in opposite directions from the fixed spring seats 151 in the plane of the brake disc 20, it will be seen that the total clearance between the brake shoes will always be divided equally upon opposite sides of the brake disc and when initially adjusted by means of the screws 178 the brake shoes will be maintained in parallel relation to each other and to the braking surfaces 26 and 27 so long as the adjustment of the nuts 168 on the brake lever connecting link 165 remains unchanged, but when, due to wear on the brake linings, it becomes necessary to change the adjustment of the nuts 168 to take up excess clearance between the brake shoes and disc, it is necessary also to readjust the screws 178 to restore the parallel relationship of the brake shoes and brake disc. When properly adjusted the brake shoes in release position will always be maintained in parallel relation with and spaced equidistant from the braking surfaces 26 and 27. Adjustment of the brake shoes in regard to clearance with respect to the braking surfaces 26 and 27 and in regard to their parallel relation is accomplished in the same manner as described in connection with the adjustment of the parts of the mechanism illustrated in Figs. 1–3 and, while the suspension of the brake parts differs from that arrangement, the adjusting mechanism for maintaining the parallel relation of the brake shoes and brake disc, functions during brake applications and releasing operations exactly the same even though in the one construction, the braking force on the levers 40 and 41 is applied below their connections to the brake shoes while on the levers 140 and 141 the force is applied above the connections to the shoes.

From the foregoing it will be seen that a propeller shaft brake arrangement has been provided wherein mechanism including opposed brake shoes, is adapted to grip a brake disc on the propeller shaft between the shoes in the operation of the arrangement and wherein adjustable and resilient devices functioning between a fixed stop in the plane of the brake disc and the respective brake levers, affords means for maintaining the shoes parallel to the brake disc and in equally spaced relation upon opposite sides of the disc and preventing dragging or chattering of the shoes in their released position.

While the mechanism has been described as fabricated from flame cut arc welded parts, the invention may be incorporated in structures comprised of cast parts or forgings without departing from the appended claims.

What is claimed is:

1. The combination with a brake disc having oppositely disposed braking surfaces, of a support, a pair of lever members pivotally mounted on the support in fixed relation to said disc, said levers each being movable at an angle to the plane of the brake disc, a pair of brake shoes each having pivotal connection with one of said lever members in oppositely disposed relation to the respective braking surfaces, means for operating said lever members to cause said brake shoes to engage the braking surfaces, means maintaining the brake shoes parallel to the braking surfaces including an adjustment screw carried by each brake shoe in spaced relation to said pivotal connection and engageable with the respectively associated lever member to limit pivotal movement of the brake shoes about the pivotal connections to the respective lever members, oppositely disposed abutment means rigid with said support in the plane of said disc, and individual spring devices between said abutments and the respective brake shoes to maintain said shoes in spaced relation to the brake disc.

2. The combination with a brake disc having oppositely disposed braking surfaces, of a support, a lever member pivotally mounted on the support in fixed relation to said disc, a second lever member connected at one end with the first member in fixed spaced relation, said levers being disposed respectively at opposite sides of the brake disc and each having one end movable at an angle to the plane of the respective braking surfaces, a pair of brake shoes each having pivotal connection with one of said lever members in oppositely disposed relation to the respective braking surfaces, means for operating said lever members to cause said brake shoes to engage the braking surfaces, an adjustment screw carried by each brake shoe in spaced relation to said pivotal connection and engageable with the respectively associated lever member to limit pivotal movement of the brake shoes about the pivotal connections to the respective lever members, oppositely disposed abutment means in the plane of said disc, and individual spring devices between said abutment means and the respective brake shoes to maintain said shoes in spaced parallel relation to the braking surfaces of said disc.

3. The combination with a brake disc having oppositely disposed braking surfaces, of a support, a pair of lever members each pivotally mounted at one end on the support in fixed relation to said disc, said levers each being movable at an angle to the plane of the brake disc, a pair of brake shoes each having pivotal connection intermediate its ends with one of said lever members intermediate the ends thereof and arranged in oppositely disposed relation to the respective braking surfaces, means for operating said lever members including an equalizing lever connected at one end to an end of one of said lever members and a connection between an end of the other lever member and an intermediate portion of such equalizing lever to cause said brake shoes to engage the braking surfaces, an adjustment screw carried by each brake shoe and engageable with the respectively associated lever member at a point intermediate said pivotally mounted end and said pivotal connection to limit pivotal movement of the brake shoe about such connection, abutment means in the plane of said disc located at that side of said pivotal connection including said adjustment screws, and spring means at opposite sides of said abutment means engageable with the respective brake shoes to maintain said shoes in spaced parallel relation to the braking surfaces of said disc.

4. The combination with a brake disc having oppositely disposed braking surfaces, of a support, a pair of lever members each pivotally mounted at one end on the support in fixed relation to said disc, said levers each being movable at an angle to the plane of the brake disc, a pair of brake shoes each having pivotal connection intermediate its ends with one of said lever members at the respectively opposite end thereof from said support and arranged in oppositely disposed relation to the respective braking surfaces, means for operating said lever members including an equalizing lever connected at one end to one of said lever members between the ends thereof and a connection between a point on the other lever member intermediate the ends thereof and an intermediate point on the equalizing lever to cause said brake shoes to engage the braking surfaces, an adjustment screw carried by each brake shoe and engageable with the respectively associated lever member at a point intermediate the ends thereof to limit pivotal movement of the brake shoe about said pivotal connection, abutment means in the plane of said disc located at that side of said pivotal connection including said adjustment screw, and spring means at opposite sides of said abutment means engageable with the respective brake shoes to maintain said shoes in spaced parallel relation to the braking surfaces of said disc.

5. The combination with a brake disc having oppositely disposed braking surfaces, of a support, a lever member pivotally mounted on the support in fixed relation to said disc, a second lever member connected at one end with the first member in fixed spaced relation, said levers being disposed respectively at opposite sides of the brake disc and each having one end movable at an angle to the plane of the respective braking surfaces, a pair of brake shoes each having pivotal connection with one of said lever members in oppositely disposed relation to the respective braking surfaces, means for operating said lever members to cause said brake shoes to engage the braking surfaces, oppositely disposed abutment means in the plane of said disc, individual spring devices between said abutment means and the respective brake shoes to maintain said shoes in spaced relation to the braking surfaces of said disc, and stop means between the brake shoes and respectively associated lever members for limiting pivotal movement of the brake shoes relative thereto.

CHARLES H. TURNER.